US009118672B2

(12) United States Patent
Novak et al.

(10) Patent No.: US 9,118,672 B2
(45) Date of Patent: Aug. 25, 2015

(54) BACK-END CONSTRAINED DELEGATION MODEL

(75) Inventors: Mark Fishel Novak, Newcastle, WA (US); Paul J. Leach, Seattle, WA (US); Liqiang Zhu, Redmond, WA (US); Paul J. Miller, Redmond, WA (US); Alexandru Hanganu, Sammamish, WA (US); Yi Zeng, Bothell, WA (US); Jeremy Dominic Viegas, Redmond, WA (US); K. Michiko Short, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 12/965,445

(22) Filed: Dec. 10, 2010

(65) Prior Publication Data
US 2012/0131661 A1  May 24, 2012

(30) Foreign Application Priority Data

Nov. 22, 2010 (AU) ................................ 2010246354

(51) Int. Cl.
*G06F 7/04* (2006.01)
*H04L 29/06* (2006.01)
*H04L 9/32* (2006.01)

(52) U.S. Cl.
CPC ........... *H04L 63/0884* (2013.01); *H04L 9/3213* (2013.01); *H04L 63/0807* (2013.01)

(58) Field of Classification Search
CPC ............ H04L 63/0884; H04L 63/0807; H04L 9/3213; G06F 21/57
USPC ......................................................... 726/10
See application file for complete search history.

(56) References Cited

U.S. PATENT DOCUMENTS 6,367,009 B1    4/2002 Davis et al.
7,555,569 B1 *  6/2009 O'Hare ............................ 710/8
(Continued)

FOREIGN PATENT DOCUMENTS

EP       1619856 A1    1/2006
WO    2007/139944 A2   12/2007
WO    2008/031043 A1    3/2008

OTHER PUBLICATIONS

MS-SFU, Kerberos Protocol Extensions; Service for User and Constrained Delegation Protocol Specification, 2008, Microsoft Corp., 2008, Retrieved from the Internet <URL: vanilla47.com/Hell947/Open%20Protocol%20Specification/OfficeProto/>, pp. 1-28 as printed.*

(Continued)

*Primary Examiner* — Michael Chao
(74) *Attorney, Agent, or Firm* — Danielle Johnston-Holmes; Micky Minhas

(57) ABSTRACT

A client can communicate with a middle tier, which can then, in turn, communicate with a back end tier to access information and resources on behalf of the client within the context of a system that can scale well. Each individual back end can establish a policy that defines which computing device can delegate to that back end. That policy can be enforced by a domain controller within the same administrative domain as the particular back end. When a middle tier requests to delegate to a back end, the domain controller to which that request was directed can either apply the policy, or, if the domain controller is in a different domain than the targeted back end, it can direct the middle tier to a domain controller in a different domain and can sign relevant information that the middle tier can utilize when communicating with that different domain controller.

20 Claims, 6 Drawing Sheets

(56) References Cited

U.S. PATENT DOCUMENTS

| | | | |
|---|---|---|---|
| 7,984,493 B2* | 7/2011 | Jones | 726/12 |
| 8,190,755 B1* | 5/2012 | Satish et al. | 709/229 |
| 2004/0073668 A1 | 4/2004 | Bhat et al. | |
| 2004/0073801 A1* | 4/2004 | Kalogridis et al. | 713/176 |
| 2004/0210756 A1* | 10/2004 | Mowers et al. | 713/168 |
| 2005/0132220 A1 | 6/2005 | Chang et al. | |
| 2006/0184646 A1 | 8/2006 | Schmidt et al. | |
| 2007/0006285 A1 | 1/2007 | Stafie et al. | |
| 2007/0073877 A1 | 3/2007 | Boykin et al. | |
| 2007/0107048 A1 | 5/2007 | Halls et al. | |
| 2007/0283443 A1 | 12/2007 | McPherson et al. | |
| 2007/0294404 A1 | 12/2007 | Boutboul | |
| 2008/0066147 A1 | 3/2008 | Dillaway et al. | |
| 2008/0086643 A1 | 4/2008 | Balasubramanian et al. | |
| 2009/0119504 A1 | 5/2009 | van Os et al. | |
| 2009/0158407 A1* | 6/2009 | Nicodemus et al. | 726/6 |
| 2009/0249431 A1 | 10/2009 | McCollum | |
| 2010/0082979 A1 | 4/2010 | Edwards | |
| 2010/0154040 A1 | 6/2010 | Chiu | |

OTHER PUBLICATIONS

RFC 4120, The Kerberos Network Authentication Service (V5), 2005, Retrieved from the Internet <URL: ietf.org/rfc/rfc4120.txt.pdf>, pp. 1-138 as printed.*

Steger, Jim, Kerberos and Delegation Tips, 2007, Retrieved from the Internet <URL: blog.sonomapartners.com/2007/04/kerberos_and_de.html>, pp. 1-6 as printed.*

Bertino et al,. "A Flexible Authorization Mechanism for Relational Data Management Systems", Retrieved at << http://spdp.dti.unimi.it/papers/tois99.pdf >>, ACM Transactions on Information Systems, vol. 17, No. 2, Apr. 1999, pp. 101-140.

Chadwick et al,. "Building a Modular Authorization Infrastructure" Retrieved at << http://www.allhands.org.uk/2006/proceedings/papers/677.pdf>>, 2008, pp. 8.

PCT International Search Report in Application PCT/US2011/060614, mailed May 30, 2012, 9 pgs.

[MS-PAC]: Privilege Attribute Certificate Data Structure; Copyright Microsoft Corporation; Release: Thursday Jun. 7, 2007, 50 pgs.

[MS-PAC]: Privilege Attribute Certificate Data Structure; Copyright 2008 Microsoft Corporation; Release: Tuesday May 20, 2008, 40 pgs.

Chinese Office Action dated Jan. 6, 2014 cited in Appln No. 201110373318.0, 7 pgs.

EP Search Report dated Jul. 2, 2014 cited in Appln No. PCT/US2011/067296, 5 pgs.

Chinese Second Office Action Patent Application No. 201110373318.0, Mailed Date: Sep. 16, 2014, 6 pgs.

Australian Examination Report dated Jan. 15, 2015 in Application No. 2011332150, 3 pgs.

Third Office Action Issued in Chinese Patent Application No. 201110373318.0, Mailed Date: Apr. 3, 2015, 6 pgs.

Australian Notice of Acceptance in Patent Application No. 2011332150, Mailed Apr. 20, 2015, 3 pgs.

* cited by examiner

BACK-END CONSTRAINED DELEGATION MODEL

CROSS REFERENCE TO RELATED APPLICATION

This application claims priority to Australian Patent Application No. 2010246354, which was filed on Nov. 22, 2010, and entitled "Back-End Constrained Delegation Model," the entire disclosure of which is incorporated herein by reference.

BACKGROUND

In their simplest form, network communications between a client and a server comprise requests from a client to a server that can be answered exclusively by that server and returned to the client. While such a system is indeed simple, it may not scale well and it may not allow the caller to interact simultaneously with multiple services, such as a file storage service, a database storage service and an electronic mail service over a single channel. To enable a client to still communicate with a single server, but yet allow the server to expand its capabilities, a tiered structure was utilized. In a tiered structure, the client could communicate its requests to a server that acted as a middle tier. That middle tier server would not itself, necessarily, comprise the relevant information needed to respond to client requests. Instead, the middle tier server could go back and reference one or more servers that were part of the back end tier of servers, to obtain the information requested by the client. Having obtained such information, the middle tier server could then respond to the client. From the perspective of the client, a single communicational endpoint, namely the middle tier, could provide access to a potentially unlimited amount of data and other informational resources.

To enable the middle tier server to respond to the client's request, it could be allowed to obtain information from the back end tier of servers on behalf of the client. From a security perspective, it can be harmful to allow the middle tier server to communicate as the client with other servers that are not in the back end tier of servers. Such an arrangement, whereby a client could provide a middle tier server with its password or long-term credentials, or other authentication information, and the middle tier server could then communicate with any servers, as the client, by providing this authentication information, was typically known as "unconstrained delegation" because the delegation of the client's role to the middle tier server was not constrained as to which server that middle tier could communicate with.

One solution to the security problems of unconstrained delegation was a delegation model typically known as "constrained delegation", whereby a policy was put in place that limited the back end tier servers to which the middle tier server could communicate on behalf of, or as, the client. Typically, a constrained delegation model operated through a domain controller, which would reference one or more relevant policies and determine whether the middle tier server would be allowed to communicate with one or more back end tier servers on behalf of, and as, the client. For example, after a client provided a middle tier server with its authentication information, the middle tier server could request, from the domain controller, the right to act on behalf of, and as, the client to one or more servers in the back end tier. The domain controller, referencing one or more relevant policies, could determine whether or not to grant the middle tier server's request, and, if it did grant the middle tier server's request, the domain controller could provide a middle tier server with a service ticket, or other collection of information, that the middle tier server could present to one or more back end tier servers indicating that the domain controller has deemed it acceptable that the middle tier server act on behalf of, and as, the client in its communications with those back end tier servers.

Unfortunately, constrained delegation can be difficult to implement across multiple domains of networked computing devices. More specifically, back end tier servers in one domain would not necessarily trust the domain controller of another, different, domain, such as the domain that comprises the middle tier server. Instead, the domain controller of the domain that comprises the middle tier server can communicate, either directly or indirectly via the middle tier server and the back end tier servers, with the domain controller of the domain that comprises the back end tier servers and provide that second domain controller with sufficient information to enable it to determine that the middle tier server is, indeed, allowed to delegate to one or more of the back end tier servers. Such a model can be difficult to implement because it requires the cooperation of the administrators of multiple domain controllers or multiple domains. Additionally, such a model focuses the constraining of the delegation on whether the middle tier server is allowed, by the domain policy, to delegate to one or more of the back end tier servers.

SUMMARY

In one embodiment, delegation by a middle tier computing device to one or more server computing devices that are part of the back end tier can be determined, not by whether domain policy allows the middle tier computing device to delegate to the one or more back end tier computing devices, but rather whether the individual policies of each of the one or more back end tier computing devices allows the middle tier computing device to delegate to it. Consequently, the role of the domain administrator is reduced and, instead, the relevant policy decision-making can be performed by the system administrators of the back end tier computing devices, who may be more familiar with the services being offered by such back end tier computing devices.

In another embodiment, a domain controller computing device, when receiving a request from a middle tier computing device to delegate to one or more back end tier computing devices, can consider whether the one or more back end tier computing devices are within the domain controller's domain. If the back end tier computing devices are within the domain controller's domain, then the domain controller computing device can provide, to the middle tier computing device, a service ticket, or other collection of information, that the middle tier computing device can present to the one or more back end tier computing devices to enable the middle tier computing device to act as, and on behalf of, a client computing device. If, however, the back end tier computing devices are not within the domain controller's domain, the domain controller computing device can, instead, provide a token, or other collection of information, to the middle tier computing device that the middle tier computing device can present to another domain controller computing device of a different domain to act as, and on behalf of, a client computing device with respect to back end tier computing devices in that other, different domain.

In a further embodiment, domain controller computing devices can validate the middle tier computing device, or other domain controller computing devices, prior to providing tokens, service tickets, or other like data that can be utilized to ultimately enable the middle tier computing device to act as, and on behalf of, the client computing device in communications with one or more back end tier computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
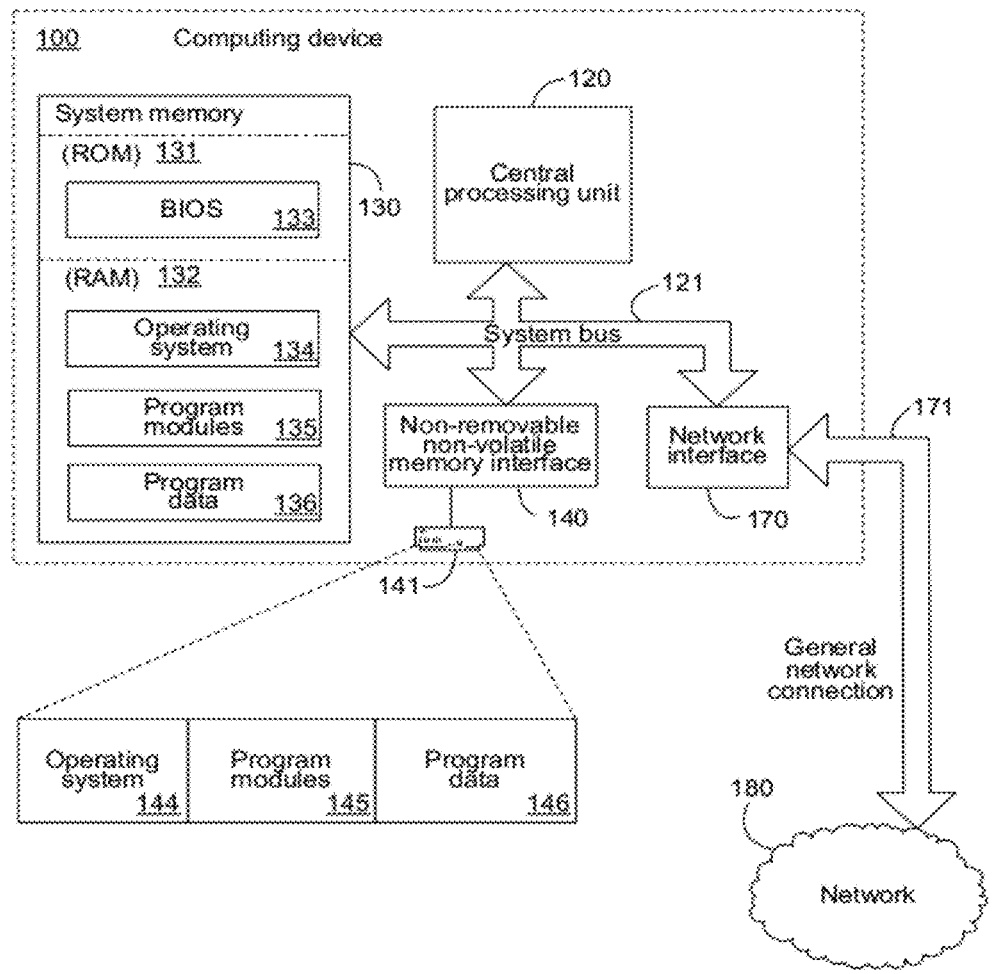
FIG. 1 is a diagram of an exemplary computing device.

The following description relates to a delegation model in which decisions regarding whether a middle tier computing device can delegate to a back end tier computing device are determined by whether the back end tier computing device will allow the middle tier computing device to delegate to it. To implement such a delegation model, in one embodiment, a domain controller computing device, when receiving a request from a middle tier computing device to delegate to a back end tier computing device, can first determine whether the back end tier computing device is within the domain controller's domain. If the back end tier computing device is in the domain controller's domain, the domain controller can provide, to the middle tier computing device, a service ticket, or other collection of information, that the middle tier computing device can present to the back end tier computing device to enable the middle tier computing device to act as, and on behalf of, a client computing device. If, however, the back end tier computing device is not within the domain controller's domain, the domain controller computing device can, instead, provide a token, or other collection of information, to the middle tier computing device that the middle tier computing device can present to another domain controller computing device of a different domain to act as, and on behalf of, a client computing device with respect to the back end tier computing device in that other, different domain. In such a manner, the ability of a middle tier computing device to act as, and on behalf of, a client computing device in its communications with a back end tier computing device can be controlled by policy enforced by a domain controller computing device of the same domain as the back end tier computing device and, consequently, by the back end tier computing device itself, as the specifier of that policy.

The techniques described herein make reference to specific types of communications and communication elements, such as "service tickets" or "tokens". Such references, however, are provided only to assign nomenclature to collections of data that provide the information necessary to inform the processes and decision-making detailed by the descriptions below. Such references are not intended to limit the techniques described to specific standardized protocols with which terminology is often associated. Consequently, while those of skill in the art may recognize that particular, existing, authentication and delegation protocols, such as Kerberos, can be leveraged to perform at least some of the elements detailed below, the descriptions provided herein are not intended to be limited to such existing protocols and are, instead, equally applicable to any collections of messages and data that can provide for, and accomplish, the individual aspects of the mechanisms and processes described below. Similarly, the techniques described herein reference one or more "domain controller" computing devices. Such references are made for notational convenience and ease of understanding and are not intended to limit the techniques described specifically to computing devices that must perform a full suite of domain controller functionality. Instead, as will be recognized by those skilled in the art, the functionality described in detail below with reference to "domain controllers" can be performed by any trusted central authority computing device. Consequently, as utilized herein, the term "domain controller" means any trusted central authority and the term "domain controller computing device" means any one or more computing devices that comprise and implement a trusted central authority.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements that can be utilized in, and aid, the methods described below. The exemplary computing device 100 can include, but is not limited to, one or more central processing units (CPUs) 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the computing device 100 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) such as the Internet, or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136. The RAM 132 can further contain data that can be relevant to the operation of the TPM 150, such as the TCG event log 190. In one embodiment, the TCG event log 190 can comprise a unique identification of all of the modules loaded or executed by the computing device 100 since power was applied or since it was last restarted; the same modules whose loading or execution can have resulted in the values currently maintained by the TPM 150 in one or more PCRs.

The computing device 100 may also include other removable/non-removable, volatile/nonvolatile computer storage media. By way of example only, FIG. 1 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Figure 2:
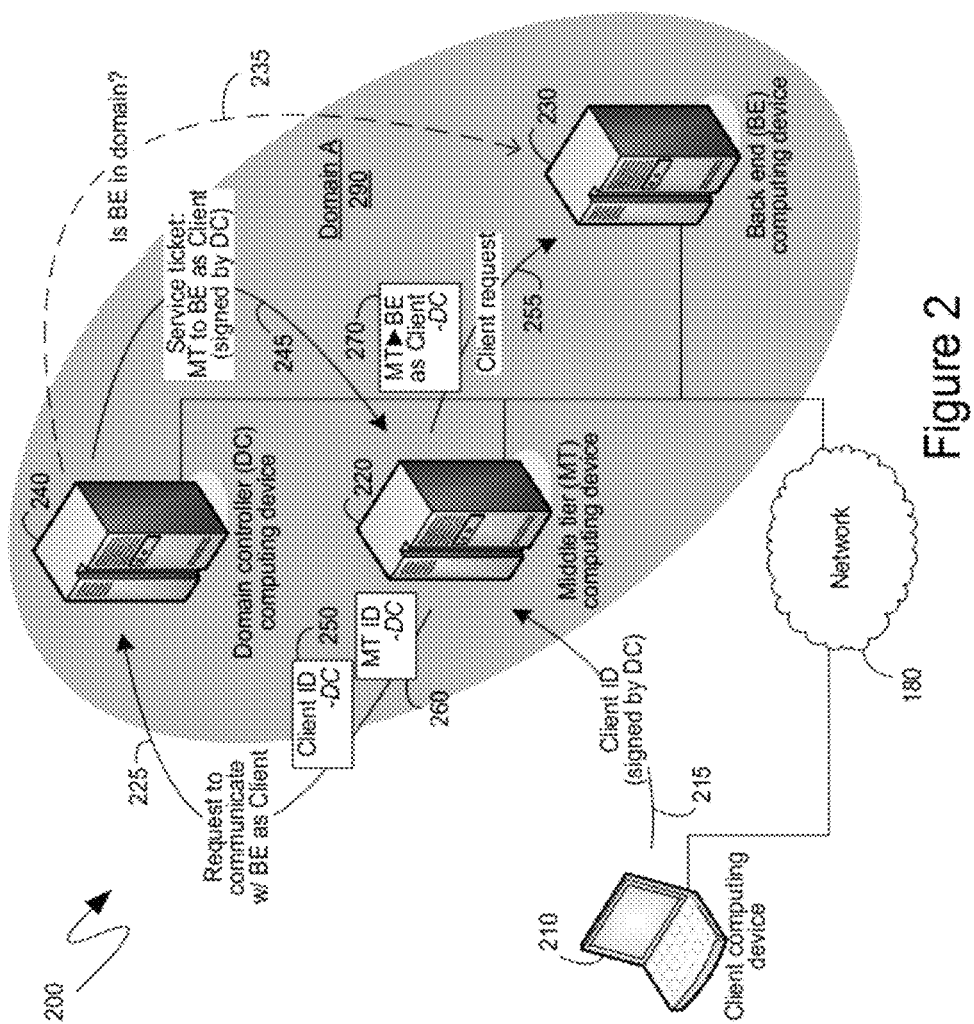
FIG. 2 is a system diagram illustrating an exemplary series of communications for enabling a middle tier computing device to delegate to a back end tier computing device within the same domain.

Turning to FIG. 2, system 200 shown therein comprises four computing devices, namely the client computing device 210, the middle tier computing device 220, the back end computing device 230, and the domain controller computing device 240. Each of these computing devices can be in the form of the exemplary computing device 100 just described and can comprise some or all of the components detailed above with reference to the exemplary computing device 100. The computing devices of the system 200 of FIG. 2 are shown to be communicatively coupled via communicational connections to the network 180. For ease of illustration, the network 180 is diagramed by a single illustrational element, but is not meant to be limited to a single network domain or any other like network division or structure, nor is it meant to illustrate a network that is external to the domain A 290 that is also shown in the system 200 of FIG. 2. Instead, as utilized in the Figures, the network 180 is meant to represent all of the network communicational connections between the computing devices of the systems illustrated in the Figures, including the various domains illustrated, and is meant to represent both direct and indirect communicational connections. Thus, for example, the system 200 shown in FIG. 2 illustrates a series of exemplary communications by which the client computing device 210 can communicate, either directly or indirectly, through the network 180, with the middle tier computing device 220. The system 200 of FIG. 2 further illustrates an exemplary series of communications by which the middle tier computing device 220 can, again either directly or indirectly, and again through the network 180, communicate with the domain controller computing device 240 and the back end computing device 230. Thus, although the middle tier computing device 220, the domain controller computing device 240 and the back end computing device 230 are all illustrated as being part of the same domain A 290, the network 180, as indicated previously, is meant to be considered as comprising the domain A 290 and is not meant to be considered as a network unit that is separate and apart from the domain A 290. As will be detailed below, the communications shown illustrate an exemplary operation of a delegation mechanism that can enable the middle tier computing device 220 to act on behalf of the client computing device 210 with respect to a back end tier computing device, such as the back end computing device 230.

Initially, as illustrated by the system 200 of FIG. 2, the client computing device 210 can authenticate itself to a middle tier computing device, such as the middle tier computing device 220, by providing, via communication 215, a client identifier, or other collection of data that can be signed by the domain controller computing device 240. For example, in one embodiment, prior to initiating communication, such as the communication 215, with a middle tier computing device 220, the client computing device 210 can first obtain a client identifier from the domain controller computing device 240. As will be recognized by those skilled in the art, the domain controller computing device 240 can perform an evaluation of the client computing device 210 prior to providing such a client identifier. For example, the domain controller computing device 240 can verify that the client computing device 210 conforms to relevant security settings, such as, for example, having the most recent versions of anti-malware software application programs installed, or, as another example, having the most recent patches installed for various operating systems and software application programs resident on the client computing device 210. Such information can be provided by the client computing device 210 as part of its communications with the domain controller computing device 240, and can be verified with a domain controller computing device with reference to, for example, an event log that can be maintained in a securely verifiable manner by the client computing device 210.

Once the domain controller computing device 240 has determined that the client computing device 210 can be allowed to communicate with other computing devices within the domain A 290 controlled by the domain controller computing device 240, and illustrated by the shaded area shown in FIG. 2, the domain controller computing device 240 can provide the client identifier, or other collection of identifying data, to the client computing device 210. Such a client identifier, or other identifying data, can be signed by a domain controller 240 such that other computing devices within the domain A 290 can verify its authenticity. For example, each of the other computing devices in the domain A 290, such as the middle tier computing device 220 and the back end computing device 230, can have access to a public key of the domain controller computing device 240. Thus, if the domain controller computing device 240 were to sign the client identifier with its private key, corresponding to the public key possessed by the other computing devices within the domain A 290, each of those other computing devices could verify such a signature with reference to that public key in a manner well known to those skilled in the art. Alternatively, rather than relying on public/private key pairs, the signing can be performed with one or more shared symmetric keys that are maintained between the domain controller computing device 240 and computing devices within the domain, such as the domain A 290, that communicate with the domain controller computing device 240.

Thus, when the client computing device 210 transmits, via the communication 215, its client identifier to the middle tier computing device 220, the middle tier computing device 220 can utilize, for example, a public key of the domain controller computing device 240, to verify that the client identifier provided by the client computing device 210 in the communication 215 was, in fact, signed by the domain controller computing device 240. Subsequent to such a verification of client computing device 210, the middle tier computing device 220 can accept requests from the client computing device 210 and can, as part of those requests, require that the client computing device 210 provide some identification or authentication information to prove that the user of the client computing device 210 is authorized to access the information or resources being requested. As will be detailed further below, such identification and authentication information can subsequently be utilized by the middle tier computing device 220 to act on behalf of the client computing device 210 with respect to back end tier computing devices, such as the back end computing device 230.

As indicated previously, the information or resources requested by a user of the client computing device 210 may not necessarily be co-located with the middle tier computing device 220. Instead, the middle tier computing device 220 can act as a singular communicational endpoint for the client computing device 210 to make any one of a myriad of requests, and the middle tier computing device 220 can then communicate with an appropriate back end tier computing device, such as the back end computing device 230, to access the relevant information or resources being requested by the user of the client computing device 210. In such a manner, a single middle tier computing device, such as the middle tier computing device 220, can provide access to a myriad of information or other resources that may be spread out across multiple back end tier computing devices, though, for ease of illustration, only a single back end tier computing device, namely the back end computing device 230, is shown in the system 200 of FIG. 2.

After the middle tier computing device 220 has validated the client computing device 210, such as with reference to the client ID transmitted via communication 215, and after the middle tier computing device 220 has received identification and authentication information from the user of the client computing device 210, which communication is not explicitly shown in the system 200 of FIG. 2 to avoid illustrational crowding, the middle tier computing device 220 can request to be allowed to communicate with the appropriate back end tier computing device, such as the back end computing device 230, as if it were the client computing device 210. Such a request 225 can, in one embodiment, be transmitted to the domain controller computing device 240, together with information that the domain controller computing device 240 can utilize to evaluate, and act upon, the request 225. For example, as illustrated in the system 200 of FIG. 2, the middle tier computing device 220 can, with the request 225, provide the client identifier 250 that it received from client computing device 210 via the communication 215, and which is signed by the domain controller computing device 240. Similarly, as also illustrated, the middle tier computing device 220 can, with the request 225, provide its own identifier 260 that, like the client identifier 250, is signed by the domain controller computing device 240.

In one embodiment, the domain controller computing device 240, upon receiving the request 225 and the identifiers 250 and 260, can verify the client computing device 210 and the middle tier computing device 220 with reference to the identifiers 250 and 260, respectively. The domain controller computing device can, also prior to determining whether to allow the middle tier computing device 220 to delegate to the back end computing device 230, first determine whether the back end computing device 230 to which the middle tier computing device 220 wishes to delegate is, in fact, within the domain A 290 of the domain controller computing device 240. Thus, as represented in the system 200 of FIG. 2 via dashed lines 235, the domain controller computing device 240 can determine whether the back end computing device 230 is within its domain 290. If the back end computing device 230 is within the domain A 290, domain controller computing device 240 can reference one or more policies to determine whether the back end computing device 230 will allow the middle tier computing device 220 to delegate to it.

The determination, by the domain controller computing device 240, of whether the back end computing device 230 will allow the middle tier computing device 220 to delegate to it can, in one embodiment, be informed, at least in part, by policies that can be established by the back end computing device 230 itself, or, more specifically, by an administrator of the back end computing device 230. As will be recognized by those skilled in the art, allowing the back end computing device 230 to set policy need not introduce any security risks, or usurp the functions of the domain controller computing device 240, since the back end computing device 230 can be trusted to properly determine who it can trust to delegate to it. Put differently, the back end computing device 230 can be trusted to establish a policy defining its criteria for trusting others to delegate to it.

In one embodiment, the domain controller computing device 240, while evaluating the one or more policies determine whether the back end computing device 230 will allow the middle tier computing device 220 to delegate to it, can perform an evaluation of the middle tier computing device 220 in a manner similar to that described above with reference to the client computing device 210. For example, the domain controller computing device 240 can verify that the middle tier computing device 220 conforms to relevant security settings, such as, for example, having the most recent versions of anti-malware software application programs installed, or, as another example, having the most recent patches installed for various operating systems and software application programs resident on the client computing device 210. More specifically, the policy being referenced by the domain controller computing device 240, including policies that can be established by the back end computing device 230, as indicated, can specify that the back end computing device 230 will only allow the middle tier computing device 220 to delegate to it if certain conditions are met including, for example, conditions referencing the relevant security settings just described. However, the relevant policies are not limited to only an analysis of the security aspects of the middle tier computing device 220 and, instead, can limit the computing devices that are allowed to delegate the back end computing device 230 based on any information, or collection of information, including, for example, the type of operating system being utilized, the type of peripherals that are attached, the hardware configuration of the computing device, or any other information or collection of information. Such information can be collected by the domain controller computing device 240 from the middle tier computing device 220, either as part of the identifier 260 of the middle tier computing device 220, or as part of subsequent communications between the domain controller computing device 240 and the middle tier computing device 220.

In one embodiment, the one or more policies referenced by the domain controller computing device 240, to determine whether to allow the middle tier computing device 220 to delegate to the back end computing device 230, can reference both the service that is executing on the middle tier computing device 220, as well as the physical middle tier computing device 220 itself. In such an embodiment, the identifier 260 of the middle tier computing device 220 can comprise, not only an identifier of the physical computing device itself, but also of the one or more services, or other collections of computer-executable instructions that are executing on the middle tier computing device 220 and that are to perform the delegation. Consequently, for purposes of the descriptions below, references to an identification, such as the identification 260, of the middle tier computing device 220 are meant to include an identification of the physical device itself, of the one or more services or other executing computer-executable instructions that are to perform the delegation, or any combination thereof.

If, based on consideration of such a policy, the domain controller computing device 240 determines that the back end computing device 230 will allow the middle tier computing device 220 to delegate to it, the domain controller computing device 240 can, as illustrated by the communication 245, provide a service ticket, or other collection of information, that can be signed by the domain controller and can indicate that the middle tier computing device 220 is to be allowed to communicate with the back end computing device 230 as the client computing device 210. The middle tier computing device 220 can then, upon the receipt of the communication 245, proceed to make the request, which it had previously received from the client computing device 210, to the back end computing device 230, as illustrated by the communication 255. The communication 255 can also comprise, as shown by the system 200 of FIG. 2, the service ticket 270 that could have been received, by the middle tier computing device 220 from the domain controller computing device 240, via the communication 245.

Although not specifically illustrated in the system 200 of FIG. 2, to avoid illustrative crowding, the back end computing device 230 can evaluate the service ticket 270, provided with the client request 255, such as with reference to a public key of the domain controller, to verify that it is, in fact, an appropriate and properly signed service ticket, and, if the back end computing device 230 so determines, it can proceed to communicate with the middle tier computing device 220 as if the middle tier computing device 220 was the client computing device 210. As such, the back end computing device 230 can request that the middle tier computing device 220 authenticate, much as the client computing device 210 could have been required to authenticate itself to the back end computing device 230 if it was communicating directly with the back end computing device 230. In such an authentication, the back end computing device 230 can determine whether to grant the client's request based on an identity of the client computing device 210 itself, based on an identity of an individual user, or group of users of the client computing device 210, or any combination thereof. Consequently, for purposes of such authentication, the middle tier computing device 220 can obtain such information from the client computing device 210 and can provide it to the back end computing device 230, either as part of the initial communication 255, or as part of subsequent communications.

In such a manner, the middle tier computing device 220 can obtain, from the back end computing device 230, information and resources that were requested by the client computing device 210, and, subsequently, the middle tier computing device 220 can return such information and resources to the client computing device 210 in response to the client computing device's original requests. As will be recognized by those skilled in the art, additional back end tier computing devices can be added within the domain A 290, and the middle tier computing device 220 can be allowed to delegate to those back end tier computing devices in the same manner, thereby allowing the middle tier computing device 220 to access a potentially practically limitless amount of information and resources, while still allowing the client computing device 210 to have a single communicational reference, maybe the middle tier computing device 220, for accessing that information and those resources. Additionally, the presently described mechanisms can be utilized in a recursive manner where, for example, the back end computing device 230 can, in turn, act as a middle tier computing device and can delegate to a further, different, back end computing device. Such further delegation can be performed in accordance with the mechanisms described herein, and can be based on independently settable policy that can be evaluated in an analogous manner.

As indicated previously, although the exemplary system 200 of FIG. 2 illustrates only a single back end computing device 230, the descriptions provided herein are equally applicable to the communications between a single middle tier computing device and multiple back end tier computing devices, where the middle tier computing device acts as an aggregator for the client computing device. For example, if the client computing device 210 were to make a request for information that was spread across multiple back end tier computing devices, including, for example, the back end computing device 230 and other back end tier computing devices, the middle tier computing device 220 could delegate to such other back end tier computing devices in the same manner as that described above, and that which will be described in further detail below. The middle tier computing device 220 could then obtain the relevant information from those multiple back end tier computing devices, which can include the back end computing device 230 illustrated in FIG. 2 and referenced in the descriptions herein, and can collect and aggregate such information for the client computing device 210 prior to presenting it to the client computing device 210 as a response to the request made by such a device.

Figure 3:
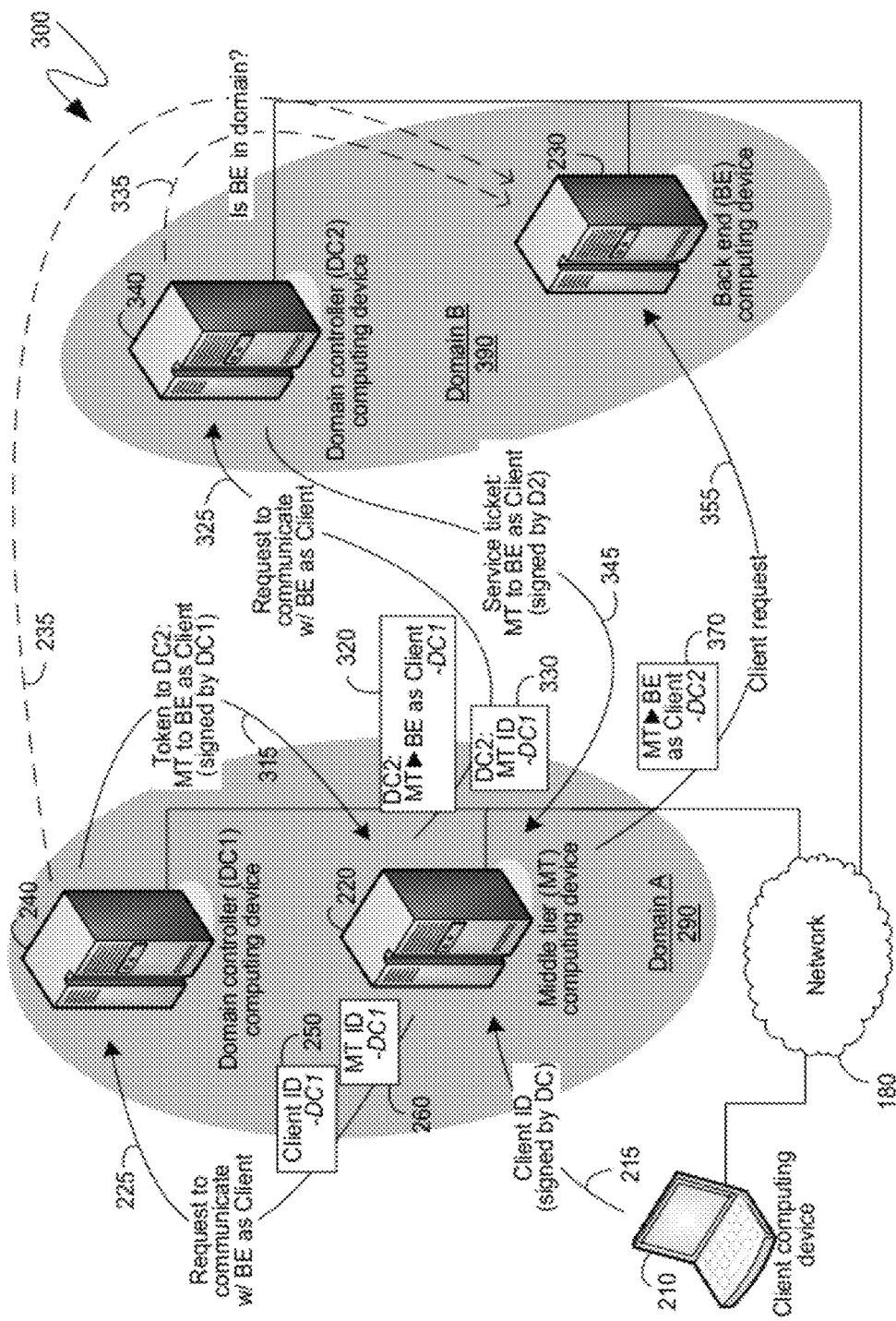
FIG. 3 is a system diagram illustrating an exemplary series of communications for enabling a middle tier computing device to delegate to a back end tier computing device in a different domain.

In other embodiments, the back end computing device 230, to which the middle tier computing device 220 needs to delegate to on behalf of the client computing device 210, in order to respond to the requests of the client computing device 210, may not necessarily be within the same domain, such as the domain A 290. Turning to FIG. 3, the system 300 shown therein illustrates a multi-domain system in which the domain controller computing device 240 and the middle tier computing device 220 remain in the domain A 290, but the back end computing device 230, to which the middle tier computing device 220 needs to delegate to, can be part of the domain B 390 that can have its own domain controller computing device 340. For purposes of distinguishing the domain controller computing device 240 of the Domain A 290, from the domain controller computing device 340 of the Domain B 390, the shorthand notation "DC1" will be utilized in FIG. 3 to reference the domain controller 240 of the Domain A 290, and the shorthand notation "DC2" will be utilized in FIG. 3 to reference the domain controller 340 of the Domain B 390. Additionally, the same communications and elements illustrated previously in FIG. 2 retain their same numeric identifiers in the system 300 of FIG. 3.

Thus, as can be seen from the system 300 of FIG. 3, the client computing device 210 can still communicate with the middle tier computing device 220 in the manner described previously, and the middle tier computing device 220 can still communicate with the domain controller computing device 240 also in the manner described previously. However, upon receiving the request, from the middle tier computing device 220, to communicate with the back end computing device 230 as the client computing device 210, via the communication 225 described previously, the domain controller computing device 240, as also described previously, can first determine, as indicated by the dashed lines 235, whether the back end computing device 230 is in the same domain as the domain controller computing device 240, namely domain A 290. In the particular example represented by the system 300 of FIG. 3, as can be seen, the back end computing device 230 is not within the same domain as the domain controller computing device 240.

Consequently, the domain controller computing device 240, rather than evaluating policy to determine whether the back end computing device 230 will allow the middle tier computing device 220 to delegate to it, can, instead, provide, to the middle tier computing device 220 via the communication 315, a token, or other collection of information, that can be signed by the domain controller computing device 240. Such a token or other collection of information can enable the middle tier computing device 220 to direct its delegation request to a different domain controller computing device, such as, in the illustrated example of FIG. 3, the domain controller computing device 340. Thus, in one embodiment, the token provided via the communication 315 can be directed to the domain controller computing device 340.

Upon receipt of the token provided by the communication 315, the middle tier computing device 220 can send a request 325, that can be analogous to the request 225 described previously, to the domain controller computing device 340 in the domain B 390. However, while the previously described request 225 also comprised the client identifier 250 and the middle tier identifier 260, both signed by the domain controller computing device 240, the request 325 that the middle tier computing device 220 has directed to the domain controller computing device 340 can comprise a token 320, that can be the previously described token, received by the communication 315, and can also comprise an identifier 330 of the middle tier computing device 220 that is signed by the domain controller computing device 240. In one embodiment, like the token 320, that was provided via the communication 315, the identifier 330 of the middle tier computing device 220 can likewise be directed to the domain controller computing device 340. In such an embodiment, either as part of the communication 315, or as part of communications occurring in conjunction with the communication 315, the middle tier computing device 220 can request, or otherwise receive, from the domain controller computing device 240 an identifier 330 that is both signed by the domain controller computing device 240 and that is directed to the domain controller computing device 340. Additionally, in one embodiment, the token 320 and the identifier 330 can be transmitted to the domain controller computing device 340 via alternate paths, including, for example, being provided directly from the domain controller computing device 240, or other alternate paths.

When the domain controller computing device 340 receives the request 325, it can first determine, in a manner analogous to that described previously with respect to domain controller computing device 240, whether the back end computing device 230, which is referenced by the request 325, is in the same domain as the domain controller computing device 340, namely the domain B 390 in the illustrative system 300 shown in FIG. 3. As before, such a determination is illustrated in FIG. 3 via the dashed lines 335. Since, in the present example, the back end computing device 230 is in the same domain as the domain controller computing device 340, namely the domain B 390, the domain controller computing device 340 can proceed to determine, such as by reference to one or more policies, whether the back end computing device 230 will allow the middle tier computing device 220 to delegate to it.

In performing such a determination, the domain controller computing device 340 can first to verify that the token 320 and the middle tier identifier 330, which were provided by the middle tier computing device 220 as part of the request 325, are properly signed by the domain controller computing device 240. For example, the domain controller computing device 340 can make such a determination with reference to the public key of the domain controller computing device 240, which the domain controller computing device 340 can have access to. Once the domain controller computing device 340 has performed such verification, it can consult one or more policies to determine whether the middle tier computing device 220 is allowed, such as by the back end computing device 230, to delegate to it. As indicated previously, the policies consulted by the domain controller computing device 340 can include policies established by the back end computing device 230, since the back end computing device 230 can be trusted to establish policies that define who it trusts to delegate to it. As also indicated previously, the policies consulted by the domain controller computing device 340 can reference practically any aspect of the middle tier computing device 220 including, for example, the operating system being executed by the middle tier computing device 220, the hardware of the middle tier computing device 220, and security attributes of the middle tier computing device 220, such as whether the most recent patches have been applied, and whether the most recent versions of anti-malware software is being utilized. Such information can be contained in the middle tier identifier 330 that can be provided by the middle tier computing device 220 to the domain controller computing device 340 via the communication 325, or, alternatively, such information can be provided via further communication exchanges between the domain controller computing device 340 and the middle tier computing device 220, performed in conjunction with the communication 325.

If the domain controller computing device 340 determines, based upon the above described evaluations, that the middle tier computing device 220 should be allowed to delegate to the back end computing device 230, the domain controller computing device can provide, via the communication 345 illustrated in FIG. 3, a service ticket, or other collection of information, that can be signed by the domain controller computing device 340 and that can enable the middle tier computing device 220 to delegate to the back end computing device 230. The middle tier computing device 220 can then, as described previously, make the request to the back end computing device 230, that was originally made to the middle tier computing device 220 by the client computing device 210, as illustrated by the communication 355. Additionally, the request 355 can include the service ticket 370 that can have been provided from the domain controller computing device 340, via the communication 345.

As before, upon receipt of the request 355, the back end computing device 230 can evaluate the service ticket 370 and verify that it was signed properly by the domain controller computing device 340 of the domain comprising the back end computing device 230, such as the domain B 390 in the illustrated example shown in FIG. 3. If the back end computing device 230 verifies the service ticket 370, it can proceed to communicate with the middle tier computing device 220 as if the middle tier computing device 220 was the client computing device 210. In such a manner, the middle tier computing device 220 can obtain information and resources from the back end computing device 230 on behalf of the client computing device 210, and can then present that information and those resources back to the client computing device 210 in response to the requests directed to the middle tier computing device 220 by the client computing device 210.

Figure 4:
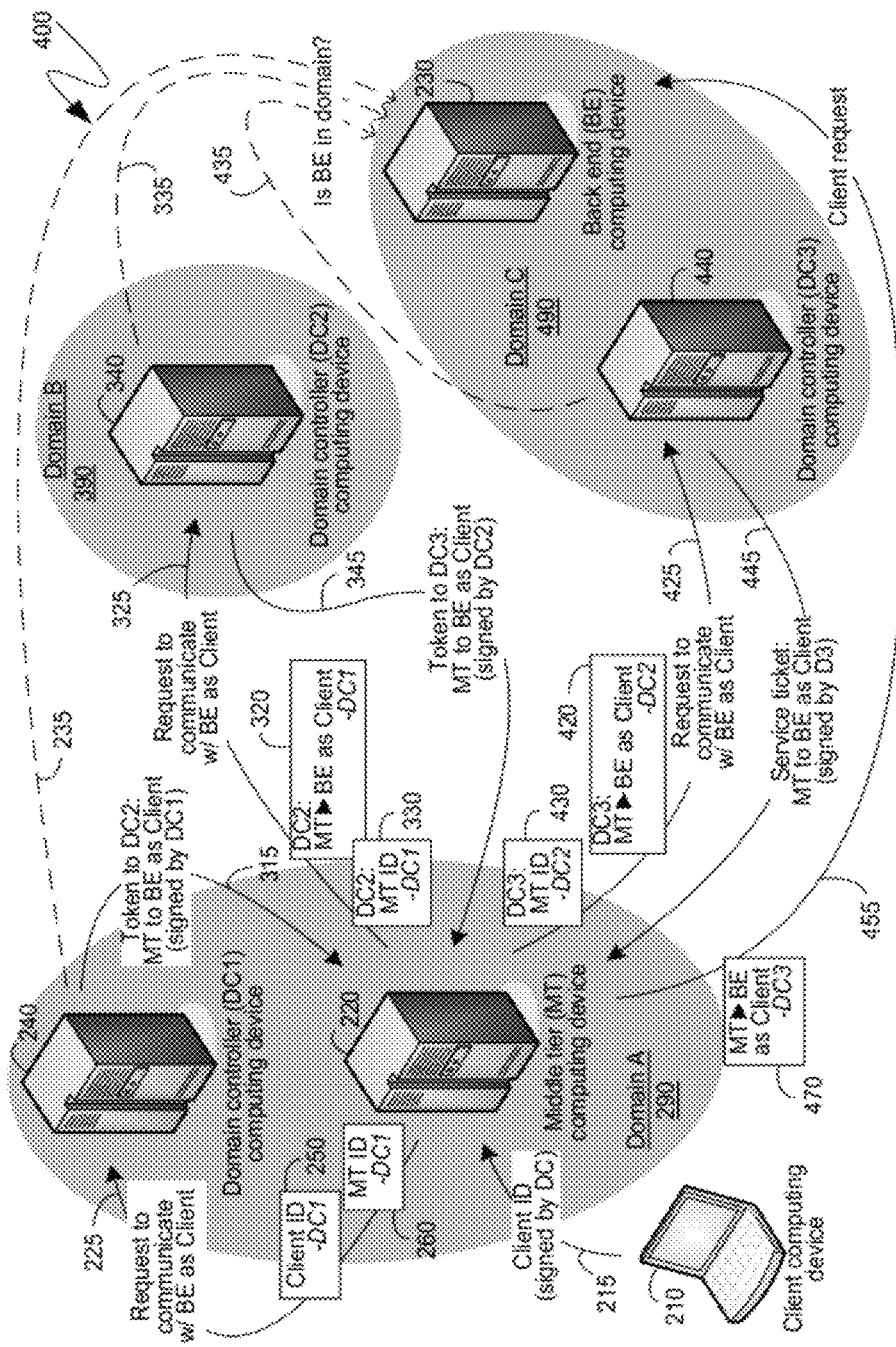
FIG. 4 is a system diagram illustrating another exemplary series of communications for enabling a middle tier computing device to delegate to a back end tier computing device in a different domain.

In certain situations, the middle tier computing device 220 may need to communicate with domain controller computing devices in more than two domains before ultimately being able to delegate to a back end tier computing device, such as the back end computing device 230. In such situations, the operation of the domain controller computing devices, and, indeed, of the overall system, can proceed in an analogous manner to that described above. Turning to FIG. 4, the system 400 shown therein provides one illustrative example of such a system, and the operation and communication of the various elements shown therein. As can be seen, the middle tier computing device 220, in attempting to delegate to the back end computing device 230, can first contact the domain controller computing device 240, via the communication 225, and the domain controller computing device 240 can, based on the evaluation illustrated by the dashed line 235, determine that the back end computing device 230 is not within the domain of the domain controller computing device 240, namely the domain A 290 in the exemplary system 400 of FIG. 4. Consequently, as before, the domain controller computing device 240 can provide, to the middle tier computing device 220, such as via the communication 315, a token to another domain controller computing device. Then, also as described previously, the middle tier computing device 220 can, via the communication 325, provide the token 320, and a middle tier identifier 330, to such a domain controller computing device 340 in a different domain, namely the domain B 390 in the exemplary system 400 shown in FIG. 4.

However, in the exemplary system 400 of FIG. 4, the back end computing device 230 to which the middle tier computing device 220 seeks to delegate to, is not part of the domain B 390. Instead, in one embodiment, the domain B 390 can simply be a domain that is "closer" to the domain with the back end computing device 230, such as the domain C 490 in the exemplary system 400 illustrated in FIG. 4. The domain controller computing device 340 of the domain B 390 can have been selected by the domain controller computing device 240, when the token to it was generated and provided to the middle tier computing device 220, because the domain controller computing device 240 believed that the domain B 390 was "closer" to the back end computing device 230. In one embodiment, at a minimum, the domain controller computing device 240 can, in selecting the next domain controller computing device, ensure that the referrals are not ultimately looping back upon themselves. Returning back to the illustrated system 400 of FIG. 4, the determination by the domain controller computing device 340 of whether the back end computing device 230 is in its domain, as illustrated by the dashed lines 335 in FIG. 4, can reveal that the back end computing device 230 is not, in fact, in the same domain as the domain controller computing device 340 namely the domain B 390. Consequently, in a manner analogous to that described above with reference to the domain controller computing device 240, the domain controller computing device 340 can provide a response 345, to the middle tier computing device 220, providing the middle tier computing device 220 with a token, signed by the domain controller computing device 340 and indicating that the middle tier computing device 220 seeks to act as the client computing device 210 in its communications with the back end computing device 230. As before, in one embodiment, the token provided via the communication 345 can be directed to another, specific, domain controller computing device, such as the domain controller computing device 440 in the domain C 490. As before, to distinguish the domain controller computing device as illustrated in FIG. 4, the shorthand notation "DC3" will be utilized in FIG. 4 to reference the domain controller computing device 440.

Upon receipt of the communication 345, from the domain controller computing device 340, the middle tier computing device 220 can, as before, direct a request 425, to communicate with the back end computing device 230 as the client computing device 210, to the other domain controller computing device specified by the communication 345, such as, in the exemplary system 400 shown in FIG. 4, the domain controller computing device 440. The request 425 can comprise the token 420 that can have been received by the communication 345 from the domain controller computing device 340, and a middle tier identifier 430. In one embodiment, to obtain the middle tier identifier 430, signed by the domain controller computing device 340, the middle tier computing device 220 can request that the domain controller computing device 340 generate such an identifier 430 based upon the middle tier identifier 330 that the middle tier computing device 220 provided to the domain controller computing device 340 as part of the request 325. If the domain controller computing device 340 trusts the domain controller computing device 240, then the domain controller computing device 340 can generate the middle tier identifier 430 by itself signing the information in the middle tier identifier 330 that was previously signed by the domain controller computing device 240. As before, in one embodiment, the middle tier identifier 430, and the token 420, can be specifically directed to the domain controller computing device 440.

The domain controller computing device 440 can then proceed in a manner analogous to that described previously with respect to domain controller computing device 240 and the domain controller computing device 340. Specifically, as illustrated by the dashed lines 435, the domain controller computing device 440 can verify that the back end computing device 230, that was identified as part of the request 425, is, in fact, within the same domain as the domain controller computing device 440, namely the domain C 490 in the exemplary system 400 of FIG. 4. Since, in the illustrated example of FIG. 4, the back end computing device 230 is within the same domain as the domain controller computing device 440, the domain controller computing device 440 can proceed to reference one or more policies, including, for example, policies established by the back end computing device 230, to determine whether the back end computing device 230 will allow the middle tier computing device 220 to delegate to it. As indicated previously, the policies consulted by the domain controller computing device 440 can reference a myriad of aspects of the middle tier computing device 220, and information regarding such aspects can be contained in the middle tier identifier 430 that can be provided by the middle tier computing device 220 to the domain controller computing device 440 via the communication 425, or, alternatively, such information can be provided via further communication exchanges between the domain controller computing device 440 and the middle tier computing device 220, performed in conjunction with the communication 425.

As before, if the domain controller computing device 440 determines that the middle tier computing device 220 is to be allowed to delegate to the back end computing device 230, the domain controller computing device 440 can return, via the communication 445, to the middle tier computing device 220, a service ticket that can be signed by the domain controller computing device 440 and that can enable the middle tier computing device 220 to communicate with the back end computing device 230 as the client computing device 210.

Subsequently, as also described previously, the middle tier computing device 220 can make appropriate requests of the back end computing device 230, as illustrated by the communication 455, and can include the service ticket 470 that was provided by the domain controller computing device 440 via the communication 445. Additionally, while only illustrated across one, two and three domains, the mechanisms described herein, as will be understood by those skilled in the art, are equally applicable across any number of domains or other like divisions.

Figure 5:
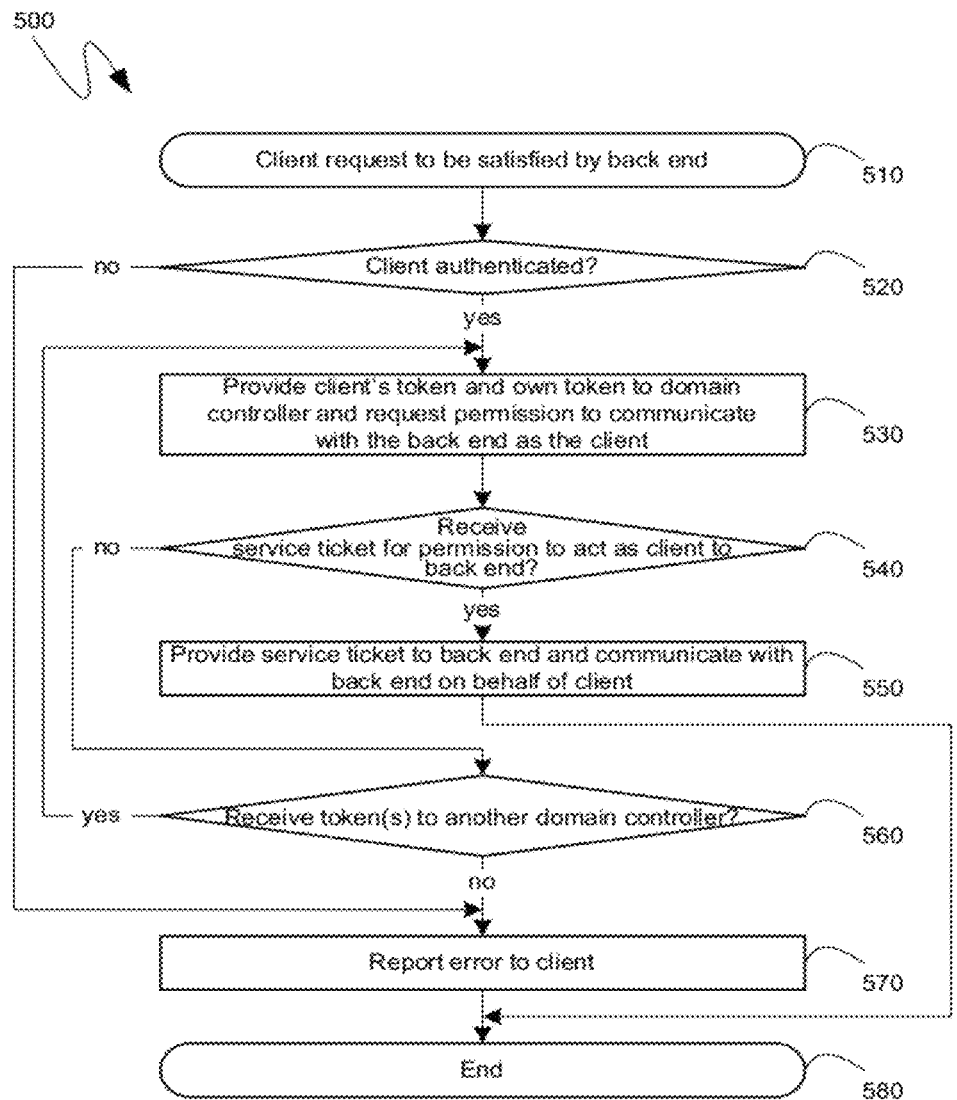
FIG. 5 is a flow diagram of an exemplary operation of an exemplary middle tier computing device.

Turning to FIG. 5, the flow diagram 500 shown therein illustrates an exemplary series of steps that can be performed by a middle tier computing device in accordance with the above described mechanisms. Initially, at step 510, a client request can be received that is directed to information or resources that are part of a back end tier computing device. The client computing device making the request can also authenticate itself, such as by providing an identifier, token, or other like information that can have been signed by a domain controller computing device. At step 520, the information provided can be validated, such as via the use of a domain controller computing device's public key. If, at step 520, the authentication fails, then processing can proceed to step 570, at which point an error can be reported. The relevant processing can then end at step 580.

Alternatively, however, if the client authentication at step 520 succeeds, then the information provided by the client computing device, and further information about the middle tier computing device, both of which can be signed by a domain controller computing device, can be provided, at step 530, to a domain controller computing device together with a request for permission to communicate with a back end tier computing device as the client computing device. In response to the provision of information at step 530, a service ticket, or other like collection of information, that can be signed by the domain controller, can be received at step 540. If, at step 540, such a service ticket was received, processing can proceed to step 550, and the service ticket can be provided to an appropriate back end tier computing device to establish communication with the back end tier computing device on behalf of the client computing device whose request was received at 510. While such communications can proceed in a manner well known to those skilled in the art, processing relevant to the present descriptions can then end at step 580. If, however, at step 540, a service ticket is not received, processing can proceed to step 560, where, instead of a service ticket, a token, or other collection of information can be received that can direct the request to communicate with a back end tier computing device as the client computing device to a different domain controller computing device. If, at step 560, such a token is received, then processing can return to step 530 and the request can be directed to another, different, domain controller computing device. Alternatively, if no token is received at step 560, and no service ticket was received at step 540, processing can proceed to step 570, an appropriate error can be reported to the client. In such a manner, a middle tier computing device can proceed to request permission to communicate with a back end tier computing device from one or more domain controller computing devices until it reaches a domain controller computing device that is in the same domain as the back end tier computing device, which can then make a decision as to whether or not one or more relevant policies indicate that the back end tier computing device will allow the middle tier computing device to delegate to it.

Figure 6:
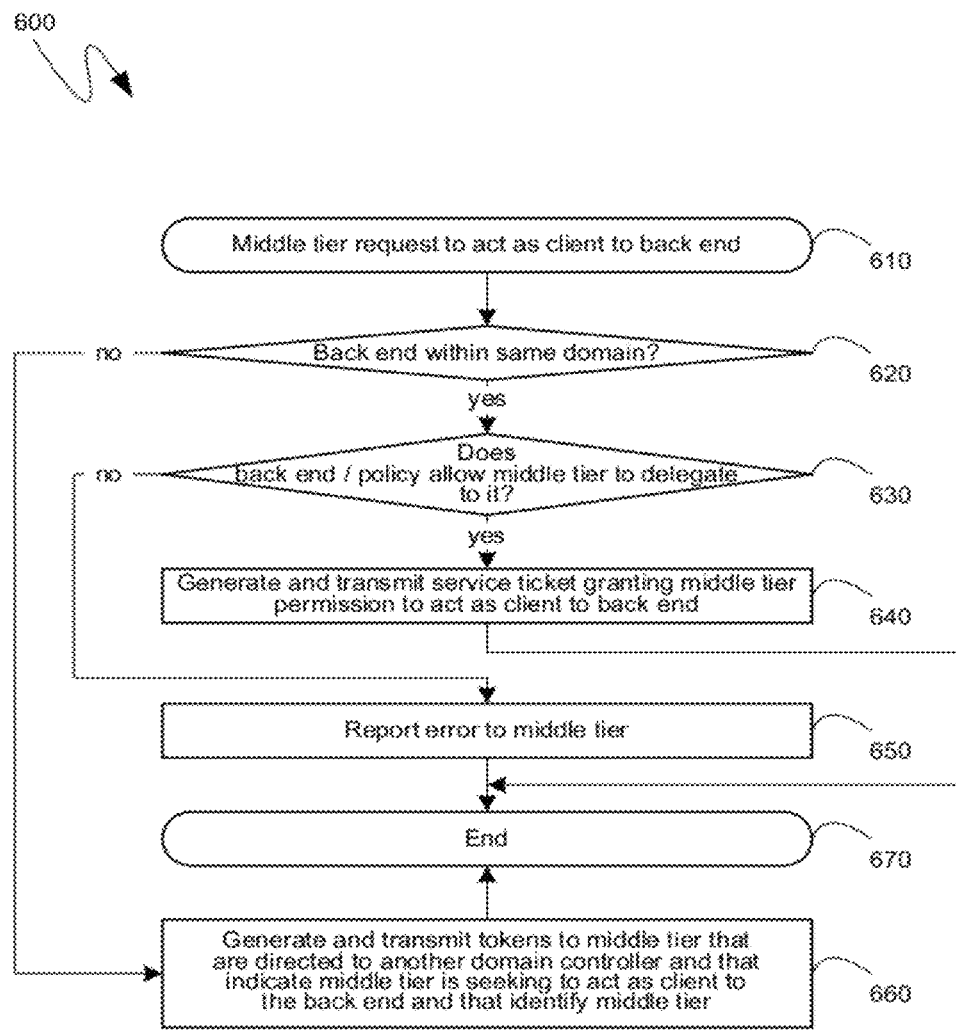
FIG. 6 is a flow diagram of an exemplary operation of an exemplary domain controller computing device.

Turning to FIG. 6, the flow diagram 600 shown therein illustrates an exemplary series of steps that can be performed by domain controller computing devices in accordance with the mechanisms described in detail above. Initially, at step 610, a request can be received from a middle tier computing device to communicate with a back end tier computing device as a client computing device. Processing can then proceed to step 620, at which point a determination can be made whether the back end tier computing device specified in the request received at step 610 is in the same domain as the computing device performing the steps of the flow diagram 600. If, at step 620, it is determined that the back end tier computing device is not in the same domain, processing can then proceed to step 660, at which point a token, or other collection of information, can be generated and transmitted to the middle tier computing device from which the request at step 610 was received. The token, or other collection of information, generated and transmitted at step 660, can comprise information directing the middle tier computing device to another domain controller, and can also comprise information informing that other domain controller that the middle tier computing device is seeking to act as the client computing device in its communications with the back end tier computing device. Additionally, as described in detail above, the information generated and transmitted at step 660 can further comprise an identification of the middle tier computing device, including, for example, various configuration information, that can be signed by the domain controller computing device. The relevant processing can then end at step 670, as shown.

Alternatively, if at step 620, it is determined that the back end tier computing device to which the request received at step 610 was directed is, indeed, within the same domain, then processing can proceed to step 630, at which point an evaluation of one or more policies can be made to determine whether the middle tier computing device making the request received at step 610 is allowed by the back end tier computing device to delegate to it. As indicated previously, the decision at step 630 can be made with reference to one or more policies that can have been defined by, and provided by, the relevant back end tier computing device. Additionally, as also indicated previously, the decision at step 630 can include a determination of whether the requesting middle tier computing device conforms to whatever factors have been established by the relevant policies, including, for example, factors that are directed to the hardware or software configuration of the middle tier computing device. As such, the decision at step 630 can include a determination of whether the information provided by the middle tier computing device at step 610 is both properly signed by a domain controller computing device, and indicates that the middle tier computing device conforms to the factors referenced by the relevant policies. Alternatively, as also indicated previously, the determination at step 630 can comprise further communications with the middle tier computing device in order to determine whether the middle tier computing device conforms to the factors referenced by the relevant policies, although, for ease of illustration, such additional communications are not specifically shown in the flow diagram 600 of FIG. 6.

If, at step 630, it is determined that the middle tier computing device is allowed to delegate to the back end tier computing device, processing can proceed to step 640, at which point a service ticket, or other information granting the middle tier computing device permission to act as the client computing device in its communications with the back end tier computing device, can be generated and transmitted to the middle tier computing device. The relevant processing can then end at step 670. Alternatively, if, at step 630, it is determined that the relevant policies do not allow the middle tier computing device to delegate to the back end tier computing device, then processing can proceed to step 650, at which point an error can be reported to the middle tier computing device. The relevant processing can then end at step 670.

As can be seen from the above descriptions, a delegation mechanism in which the ability of one computing device to delegate to another computing device as informed by the computing device being delegated to, has been presented. In view of the many possible variations of the subject matter described herein, we claim as our invention all such embodiments as may come within the scope of the following claims and equivalents thereto.

We claim:

1. A system for enabling delegation, the system comprising:
 at least one processor; and
 a memory operatively coupled to the at least one processor, the memory storing instructions, that when executed by the at least one processor, perform a method comprising:
  receiving, by a first computing device for controlling a first domain, a request from a second computing device in a second domain to communicate as a client to a third computing device;
  determining the third computing device is in the first domain;
  identifying one or more policy requirements for delegating to the third computing device, wherein at least one of the one or more policy requirements is established by the third computing device and enforced by the first computing device;
  receiving configuration information regarding the second computing device and a fourth computing device for controlling the second domain;
  determining whether the identified one or more policy requirements are satisfied based in part on the received configuration information regarding the second computing device and the fourth computing device for controlling the second domain; and
  generating a signed service ticket granting the request to communicate.

2. The system of claim 1, wherein at least one policy requirement of the one or more policy requirements references a service that is executing on the second computing device.

3. The system of claim 1, wherein the method further comprises requesting information associated with the one or more policy requirements.

4. The system of claim 1, wherein the method further comprises:
 receiving a signed identification;
 verifying a signature; and
 signing the received identification if the verifying was successful.

5. The system of claim 1, wherein the method further comprises receiving a token of the client and a token of the second computing device.

6. The system of claim 5, wherein the token of the second computing device has a signature from the fourth computing device for controlling the second domain.

7. A system for enabling delegation, the system comprising:
 at least one processor; and
 a memory operatively coupled to the at least one processor, the memory storing instructions that, when executed by the at least one processor, perform a method comprising:
  sending, by a first computing device in a first domain, a request to communicate as a client to a second computing device in a second domain;

sending, to a third computing device for controlling the second domain, configuration information regarding the first computing device and a fourth computing device for controlling the first domain;

receiving a service ticket for allowing the request, wherein the service ticket indicates that a set of policy requirements established by the second computing device, and enforced by third computing device, are satisfied; and presenting the service ticket to the second computing device.

8. The system of claim 7, wherein the method further comprises communicating to the second computing device as a client.

9. The system of claim 7, wherein the method further comprises receiving a token to access another domain.

10. The system of claim 9, wherein the token has a signature from the fourth computing device for controlling the first domain.

11. The system of claim 7, wherein the method further comprises providing, by the first computing device, a token of the client and a token of the first computing device to the third computing device.

12. The system of claim 7, wherein the method further comprises receiving a request from the client to access the second computing device.

13. The system of claim 7, wherein the service ticket is a collection of information indicating that the first computing device is allowed to communicate with the second computing device.

14. A computer-implemented method for enabling delegation, the method comprising:

receiving, by a first computing device for controlling a first domain, a request from a second computing device in a second domain to communicate as a client to a third computing device;

determining the third computing device is in the first domain;

identifying one or more policy requirements for delegating to the third computing device, wherein at least one of the one or more policy requirements is established by the third computing device and enforced by the first computing device;

receiving configuration information regarding the second computing device and a fourth computing device for controlling the second domain;

determining whether the identified one or more policy requirements are satisfied based in part on the received configuration information regarding the second computing device and the fourth computing device for controlling the second domain; and generating a signed service ticket granting the request to communicate.

15. The method of claim 14, wherein at least one policy requirement of the one or more policy requirements references a service that is executing on the second computing device.

16. The method of claim 14, further comprising requesting information associated with the one or more policy requirements.

17. The method of claim 14, further comprising:

receiving a signed identification;

verifying a signature; and signing the received identification if the verifying was successful.

18. The method of claim 14, further comprising receiving a token of the client and a token of the second computing device.

19. The method of claim 14, further comprising receiving a token of the client and a token of the second computing device.

20. The method of claim 14, wherein the token of the second computing device has a signature from the fourth computing device for controlling the second domain.

* * * * *